United States Patent [19]

Chen

[11] 4,292,189
[45] Sep. 29, 1981

[54] THERMAL ENERGY STORAGE COMPOSITION COMPRISING SODIUM SULFATE DECAHYDRATE; SODIUM CARBONATE DECAHYDRATE; AND SODIUM TETRABORATE DECAHYDRATE

[75] Inventor: Johnson C. Chen, Philadelphia, Pa.

[73] Assignee: Pennwalt Corporation, Philadelphia, Pa.

[21] Appl. No.: 61,590

[22] Filed: Jul. 30, 1979

[51] Int. Cl.³ .............................................. C09K 5/06
[52] U.S. Cl. ................................................... 252/70
[58] Field of Search .................. 252/70; 126/400, 900, 126/430, 436

[56] References Cited

U.S. PATENT DOCUMENTS

| | | | |
|---|---|---|---|
| 2,677,664 | 5/1954 | Telkes | 252/70 |
| 3,720,198 | 3/1973 | Lang et al. | 252/70 X |
| 3,986,969 | 10/1976 | Telkes | 252/70 |
| 4,037,650 | 7/1977 | Randall | 252/70 X |

FOREIGN PATENT DOCUMENTS

| | | | |
|---|---|---|---|
| 50-90583 | 7/1975 | Japan | 252/70 |
| 51-96788 | 8/1976 | Japan | 252/70 |

OTHER PUBLICATIONS

Johnson, "Lightweight Thermal Storage for Solar Heated Buildings", *Solar Energy,* 19, pp. 669–675, 1977.
"Chemical Mixture Creates 'Midnight Sun'", *Chemical Week,* Mar. 1, 1978, pp. 34–35.

*Primary Examiner*—Harris A. Pitlick
*Attorney, Agent, or Firm*—Robert G. Danehower

[57] ABSTRACT

A thermal energy storage composition is disclosed that stores heat upon melting and releases heat upon solidification. It is composed of a mixture of sodium sulfate decahydrate, sodium carbonate decahydrate, sodium borate decahydrate and a thickening agent. Its good heat transfer characteristics, relatively high latent heat of fusion, low cost, and favorable melting point allow this material to be particularly useful for space heating applications.

3 Claims, No Drawings

THERMAL ENERGY STORAGE COMPOSITION COMPRISING SODIUM SULFATE DECAHYDRATE; SODIUM CARBONATE DECAHYDRATE; AND SODIUM TETRABORATE DECAHYDRATE

BACKGROUND OF THE INVENTION

This invention relates to a thermal energy storage composition with good stability and physical properties, especially useful for space heating applications where it is incorporated in either active or passive thermal energy storage systems. The objects of such storage systems are to provide operating efficiencies to thermal operations, to achieve energy savings, and to permit the introduction of new, alternative energy sources, such as solar energy, that are characterized by intermittent availability. Individual tailoring of each storage system is required to match the requirements of each of the potential applications. Current, commercial systems employ the specific heat capacity of water, rock, or ceramics to store the heat. However, large volumes, large temperature swings, and bulky, expensive heat exchange apparatus are required.

Commercialization has recently begun of systems employing phase-change materials to store the heat. These materials store significant quantities of energy upon melting. Conversely, this energy is liberated when the liquid is solidified. A number of these phase-change materials are disclosed in U.S. Pat. No. 3,986,969 such as calcium chloride hexahydrate, sodium carbonate decahydrate, disodium phosphate dodecahydrate, calcium nitrate tetrahydrate, sodium sulfate decahydrate and sodium thiosulfate pentahydrate.

A candidate phase-change material that has received research and development effort over several decades is Glauber's salt, sodium sulfate decahydrate. Its heat of fusion is high, its melting point is appropriate for many space heating applications, and its price is low; however, Glauber's salt suffers from loss of its water of hydration, separation into an anhydrous sodium sulfate layer and a water layer, and a consequent loss of ability to store heat. Another serious problem is its tendency to supercool, releasing thermal energy in large quantities at undetermined times. Many modifications by way of additives and container configurations have been tried in order to overcome these problems. Thus, the patentee in U.S. Pat. No. 2,677,664 disclosed and claimed the use of borax as a nucleating agent to prevent supercooling in a thermal storage composition based on Glauber's salt. The same patentee added a homogenizing or thickening agent such as attapulgus clay to the same composition in U.S. Pat. No. 3,986,969 in order to slow the rate of separation.

Use of thin tray containers allows convective currents to help keep the components mixed. A rotating drum has been tried to prevent component separations. Both indirect and direct-contact thermal exchange arrangements have been demonstrated. Despite these efforts, sufficient problems remain with phase-change candidates so that significant commercial use of any of them has not occurred.

SUMMARY OF INVENTION

I have now discovered a phase-change thermal energy storage composition that considerably reduces the problems of supercooling and layer separation. My composition consists essentially of sodium sulfate decahydrate, sodium carbonate decahydrate, sodium borate decahydrate and small amounts of a thickening agent. This composition has a freeze-thaw range of 21° to 24° C. which makes it highly desirable for solar energy application.

DETAILED DESCRIPTION OF INVENTION

My phase-change energy storage system is based on a combination of two inorganic salts together with nucleating and thickening agents. The two inorganic salts are sodium sulfate decahydrate, $Na_2SO_4.10H_2O$, also called Glauber's salt and sodium carbonate decahydrate, $Na_2CO_3.10H_2O$.

The sodium sulfate decahydrate is used at a concentration ranging from about 30% to 50% by weight of the composition. At concentrations outside of the indicated range, the tendency to separate into undesirable layers increases considerably.

The sodium carbonate decahydrate is used at a concentration ranging from about 50% to 60% by weight of the composition. Concentrations of the sodium carbonate decahydrate exceeding about 60% by weight of the composition tend to promote layer separation.

The third component of my energy storage-release composition is sodium borate decahydrate which is present as a nucleating agent. The sodium borate decahydrate is used at a concentration ranging from about 1% to 10% by weight of the composition. If less than about 1.0% of $Na_2B_4O_7.10H_2O$ is employed, excessive supercooling is observed. Amounts of $Na_2B_4O_7.10H_2O$ in excess of 10% are not required to prevent supercooling and in fact have a deleterious effect on the melting/freezing profile as well as the stability of the mixture.

A preferred thermal energy storage composition consists essentially of the following principal ingredients in the weight ratio indicated as follows: sodium sulfate decahydrate—40%, sodium carbonate decahydrate—55%, and sodium tetraborate—5%. This composition melts and freezes in the passive heating range of 21°–24° C. with only gentle agitation being required during phase transition to prevent supercooling or separation of components.

When a thickener is used, the above principal ingredients would be used in the same ratio but at slightly lower amounts. For example, if 4.75% of thickener is used in my composition, the concentrations would be;
sodium sulfate decahydrate—38.1%,
sodium carbonate decahydrate—52.4%,
sodium borate decahydrate—4.75%,
thickening agent—4.75%.

With addition of about 5% of thickening agent, no separation is observed over a number of thermal cycles. Below about 0.5% of thickening agent significant benefits are not observed while above about 8% the stability of the mixture and the melting/freezing profile are affected. The thickener can be one or more members selected from the group consisting of sawdust, wood shavings, sodium methyl cellulose, sodium ethylcellulose, starch, alginates, silica gel, diatamaceous earth, clay and finely divided silica. A preferred thickening agent is fumed silica sold under the trademark CAB-O-SIL.

Other additives may be used in my thermal energy storage composition in small amounts which do not affect the stability of the mixture or the melting/freezing profile. Such additives are corrosion inhibitors such as sodium chromate, sodium dichromate and sodium nitrite. Bactericides, fungicides and insecticides may be also used to maintain the composition clean and sterile. Surface active agents are used in small amounts to disperse and suspend the various components of the thermal energy storage composition. These additives are usually present at concentrations ranging from 0.005 to 0.5 percent by weight.

The preparation of the mixture can be accomplished in a number of ways. For convenience, the anhydrous salts of sodium sulfate and sodium carbonate can be added with the sodium borate decahydrate to the calculated amount of water with stirring. Gently warming the mixture facilitates dissolution. Addition of a small excess of water also facilitates dissolution and has no adverse effects on performance. A small amount of thickening agent, such as Cabosil can be added if desired according to engineering considerations. Once all the ingredients are in solution, the liquid is introduced into the thermal energy storage chamber. Conventional thermal energy storage equipment used in accordance with industry-wide accepted practices is sufficient as long as provision is made for slight agitation while the material is changing phase. Complicated high performance equipment is not required.

A preferred method of preparing my thermal energy storage composition requires that the sodium tetraborate decahydrate, anhydrous sodium carbonate and water are stirred together to make a clear solution. The amount of water is that amount necessary to form sodium carbonate decahydrate and sodium sulfate decahydrate.

This amount is 1.267 parts of water per part of anhydrous sodium sulfate and 1.698 parts of water for each part of sodium carbonate. The thickening agent, if used, is then added with stirring, preferably high speed stirring, to give a viscous mixture. In the next step of the process, finely divided anhydrous sodium sulfate, having a particle size of about one micron in diameter, is added slowly to the viscous mixture during vigorous stirring. Too rapid addition of the sodium sulfate will cause agglomeration to take place. This method of preparation insures homogenous distribution of the sodium sulfate throughout the matrix and prevents separation of the composition during the heating and cooling cycles.

The best mode of practicing my invention will be apparent from a consideration of the following examples:

EXAMPLE 1

Anhydrous sodium carbonate, 2030 g, anhydrous sodium sulfate, 1760 g, and sodium tetraborate decahydrate, 500 g, where added with stirring to 7210 g of water. The mixture was stirred and heated to about 34° C. until all of the salts were dissolved. The solution was then poured into a chamber equipped with a heat exchanger for heating and cooling. The solution was alternately and repeatedly cooled and heated so that the salts crystallized and remelted over twenty times without change. The melt-fusion temperature range is 21°–24° C. with supercooling to 15° C. occurring when the mixture is not gently agitated at the fusion temperature. When the material is melted, additional slight agitation is applied for a few minutes to assist complete formation of a solution. The storage capacity based on the heat of fusion is 45 cal/g.

EXAMPLE 2

Anhydrous sodium carbonate (102 g) and borax (25 g) were mixed with 285 g of water to make a clear solution. Fume silica thickening agent Cab-o-sil (25.5 g) was added to the sodium carbonate-borax solution under high speed stirring (5000 rpm) to make a homogenous paste-like mixture. While still under high speed stirring, 88 g of fine anhydrous sodium sulfate powder was added slowly in such a manner that agglomeration did not occur. The stirring was continued for another 3 minutes after the addition of sodium sulfate was complete. The resulting mixture was ready to be placed in containers for storage and release of thermal energy.

EXAMPLE 3

The mixture prepared in Example 2 was divided into 50 g portions and placed in glass vials measuring 3½" by 1" diameter and sealed with air tight screw caps. Six vials were placed in a 1000 ml glass beaker filled with water. The beaker and content was placed in ice bath and on a hot plate alternatively allowing enough time for the phase change material to freeze and melt respectively. During the heating cycle, the water temperature in the beaker was never allowed to exceed 38° C. No separation of the composition occurred during 50 freeze-thaw cycles.

I claim:

1. A composition for storing and releasing thermal energy consisting essentially of the following ingredients expressed in percent by weight:
sodium sulfate decahydrate—about 30–50%,
sodium carbonate decahydrate—about 50–60%,
sodium borate decahydrate—about 1–10% and
a thickening agent—about 0.5 to 8%,
wherein the composition melts and freezes within the range of 21° to 24° centigrade.

2. The composition of claim 1 in which the sodium sulfate decahydrate is present at 40%, the sodium carbonate decahydrate is present at 55% and the sodium borate decahydrate is present at 5 percent.

3. The composition of claim 1 in which the thickening agent is fumed silica at a concentration of 3 percent.

* * * * *